(12) United States Patent
Williams et al.

(10) Patent No.: US 12,367,040 B2
(45) Date of Patent: Jul. 22, 2025

(54) QUANTIFYING THE IMPACT OF SOFTWARE CODE REUSE

(71) Applicants: AT&T Intellectual Property I, L.P., Atlanta, GA (US); AT&T Global Network Services Belgium Luxembourg SP, Vilvoorde (BE)

(72) Inventors: Richard Williams, Morganville, NJ (US); Christophe Closset, Jehay (BE); Lynn Fuhrmann, St. Charles, MO (US); Catherine Lefevre, Corroy-le-Chateau (BE)

(73) Assignees: AT&T Intellectual Property I, L.P., Atlanta, GA (US); AT&T Global Network Services Belgium Luxembourg SP, Vilvoorde (BE)

( * ) Notice: Subject to any disclaimer, the term of this patent is extended or adjusted under 35 U.S.C. 154(b) by 174 days.

(21) Appl. No.: 18/149,064

(22) Filed: Dec. 30, 2022

(65) Prior Publication Data
US 2024/0220241 A1     Jul. 4, 2024

(51) Int. Cl.
   *G06F 8/77*     (2018.01)
   *G06F 8/36*     (2018.01)

(52) U.S. Cl.
   CPC . *G06F 8/77* (2013.01); *G06F 8/36* (2013.01)

(58) Field of Classification Search
   USPC ........................................................ 717/101
   See application file for complete search history.

(56) References Cited

U.S. PATENT DOCUMENTS

| | | |
|---|---|---|
| 8,230,392 B2 | 7/2012 | Joss |
| 8,479,145 B2 | 7/2013 | Swaminathan et al. |
| 8,688,676 B2 | 4/2014 | Rush |
| 9,268,805 B2 | 2/2016 | Crossley |
| 9,519,464 B2 | 12/2016 | Dang |
| 9,612,831 B2 | 4/2017 | Mendis |
| 10,275,333 B2 | 4/2019 | Shiraishi |
| 10,545,733 B2 | 1/2020 | Sabharwal |
| 10,768,909 B2 | 9/2020 | Ramanathan |

(Continued)

FOREIGN PATENT DOCUMENTS

| | | |
|---|---|---|
| CA | 2956207 C | 3/2020 |
| EP | 3082036 A1 | 10/2016 |

OTHER PUBLICATIONS

Erik Dietrich; "Code Reuse is Not a Good First Class Goal—NDepend"; NDepend.com blog page [full URL included in ref.]; Nov. 2, 2017 (Year: 2017).*

(Continued)

*Primary Examiner* — Bradley A Teets
*Assistant Examiner* — Clint Thatcher

(57) ABSTRACT

Methods, computer-readable media, and systems for automated quantification of the impact of software code reuse are disclosed. A method performed by a processing system including at least one processor includes estimating an amount of a piece of source code that comprises reused code, estimating a resource cost associated with a development of the piece of source code, estimating an amount of resources saved by using the reused code in the piece of source code, based on the resource cost and the amount of the piece of source code that comprises the reused code, and initiating a modification to the piece of source code in response to the amount of resources saved.

20 Claims, 4 Drawing Sheets

(56) References Cited

U.S. PATENT DOCUMENTS

| | | | |
|---|---|---|---|
| 10,810,009 | B2 | 10/2020 | Johannes van Schaik |
| 11,520,567 | B2 | 12/2022 | Liu |
| 11,675,575 | B2 | 6/2023 | Huang |
| 11,853,745 | B2 | 12/2023 | Balasubramanian |
| 2016/0295463 | A1 | 10/2016 | Dsouza |
| 2017/0177309 | A1 | 6/2017 | Bar-Or |
| 2017/0371629 | A1 | 12/2017 | Chacko |
| 2018/0365287 | A1* | 12/2018 | Fontenot ............... G06F 16/245 |
| 2019/0121621 | A1 | 4/2019 | Aggarwal |
| 2019/0250893 | A1 | 8/2019 | Pandit |
| 2019/0391792 | A1 | 12/2019 | Sabharwal |
| 2020/0348929 | A1 | 11/2020 | Sousa |
| 2021/0081182 | A1 | 3/2021 | Seshadri |
| 2021/0109721 | A1 | 4/2021 | Ramanathan |
| 2021/0382712 | A1 | 12/2021 | Richman |
| 2022/0122025 | A1* | 4/2022 | Amit ........................ G06F 8/77 |
| 2022/0164170 | A1 | 5/2022 | Benton |
| 2022/0276860 | A1 | 9/2022 | Balasubramanian |
| 2022/0276862 | A1 | 9/2022 | Balasubramanian |
| 2022/0291921 | A1 | 9/2022 | Balasubramanian |

OTHER PUBLICATIONS

Jeremy Morgan; "Reusable Code: The Good, The Bad, and The Ugly"; DEV blog site(dev.to) [full URL included in ref.]; Last Edited Aug. 22, 2019 (Year: 2019).*

Christophe Closset, "Quantifying Software Code Reuse," U.S. Appl. No. 17/805,023, filed Jun. 1, 2022, 36 pages.

Michail Papamichail et al. "User-Perceived Reusability Estimation Based on Analysis of Software Repositories"; Electrical and Computer Engineering Dept., Aristotle University of Thessaloniki Thessaloniki, Greece—Mal TeSQuE 2018, Campobasso, Italy; 2018 IEEE.

* cited by examiner

QUANTIFYING THE IMPACT OF SOFTWARE CODE REUSE

The present disclosure relates generally to software development, and relates more particularly to devices, non-transitory computer-readable media, and methods for automated quantification of the impact of software code reuse.

BACKGROUND

The field of software development has come to rely heavily on the reuse of code, and this reliance is only expected to increase in the future. Code reuse in this context is understood to refer to the use of existing software code for a new function or software. By reusing existing code, the costs to develop new software can be lowered and the time dedicated to developing the new software can be reduced. Thus, many software development platforms may have access to an evolving repository of reusable code.

SUMMARY

The present disclosure broadly discloses methods, computer-readable media, and systems for automated quantification of the impact of software code reuse. In one example, a method performed by a processing system including at least one processor includes estimating an amount of a piece of source code that comprises reused code, estimating a resource cost associated with a development of the piece of source code, estimating an amount of resources saved by using the reused code in the piece of source code, based on the resource cost and the amount of the piece of source code that comprises the reused code, and initiating a modification to the piece of source code in response to the amount of resources saved.

In another example, a non-transitory computer-readable medium may store instructions which, when executed by a processing system including at least one processor, cause the processing system to perform operations. The operations may include estimating an amount of a piece of source code that comprises reused code, estimating a resource cost associated with a development of the piece of source code, estimating an amount of resources saved by using the reused code in the piece of source code, based on the resource cost and the amount of the piece of source code that comprises the reused code, and initiating a modification to the piece of source code in response to the amount of resources saved.

In another example, a device may include a processing system including at least one processor and a non-transitory computer-readable medium storing instructions which, when executed by the processing system, cause the processing system to perform operations. The operations may include estimating an amount of a piece of source code that comprises reused code, estimating a resource cost associated with a development of the piece of source code, estimating an amount of resources saved by using the reused code in the piece of source code, based on the resource cost and the amount of the piece of source code that comprises the reused code, and initiating a modification to the piece of source code in response to the amount of resources saved.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

The present disclosure broadly discloses methods, computer-readable media, and systems for quantifying the impact of software code reuse in an automated manner. As discussed above, the field of software development has come to rely heavily on the reuse of code (i.e., the use of existing software code for a new function or software), and this reliance is only expected to increase in the future. By reusing existing code, the costs to develop new software can be lowered and the time dedicated to developing the new software can be reduced. Thus, many software development platforms may have access to an evolving repository of reusable code. Moreover, by building a knowledge base of internal and external reused code, a foundation can be provided for advanced capabilities, such as machine learning and artificial intelligence-based techniques which can be used to derive insights into reusable code.

However, while the value of reusing code is generally recognized, there exists no known way to estimate the precise amount of that value, for instance in terms of money or time that is saved. Knowing the exact amount of money or time that is saved through the reuse of code may encourage further code reuse and make the overall software development pipeline more cost and time efficient.

Examples of the present disclosure provide an automated means for quantifying the impact of code reuse. In one example, the amount of reused code in a piece of source code may be estimated. The amount of reused code may be expressed as a number of lines of code that are reused, or as a ratio of a number of lines of code that are reused to a total number of lines of code in the piece of source code. The resource cost (e.g., money and/or time) incurred in the development of the piece of source code may then be estimated, and an amount of resources saved may be estimated based on the amount of reused code and the resource cost. Thus, examples of the present disclosure allow one to quantify the impact of reusing code in a piece of source code (e.g., where the impact may be expressed as an amount of time and/or an amount of money that was saved by not writing the reused code from scratch). These and other aspects of the present disclosure are discussed in greater detail below in connection with the examples of FIGS. 1-4.

Figure 1:
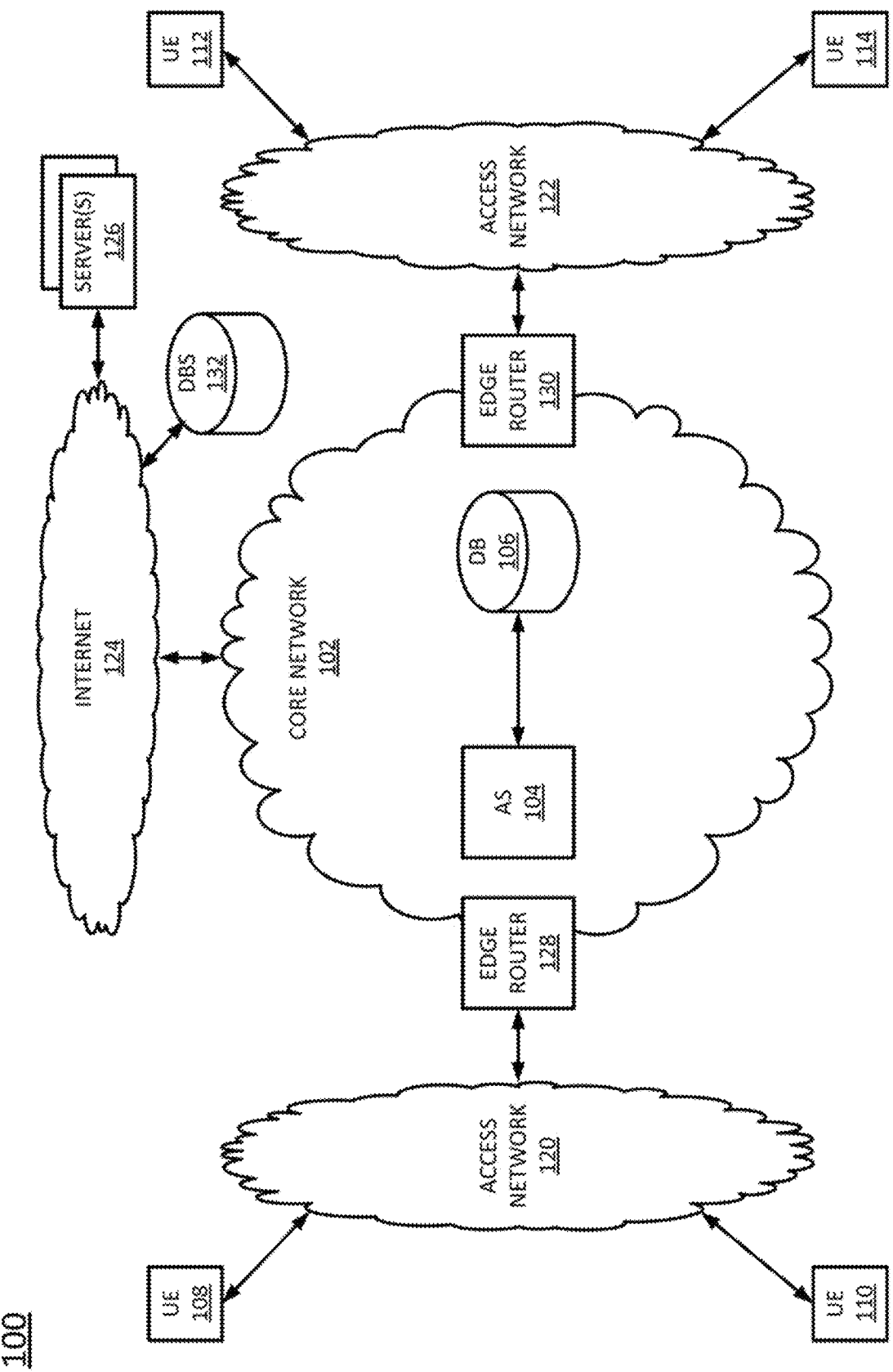
FIG. 1 illustrates an example system in which examples of the present disclosure for quantifying the impact of software code reuse in an automated manner may operate.

To further aid in understanding the present disclosure, FIG. 1 illustrates an example system 100 in which examples of the present disclosure for quantifying the impact of software code reuse in an automated manner may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, a database (DB) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of the core network 102 may provide a cable television service, an IPTV service, media streaming service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices (UEs) 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device, such as computing system 400 depicted in FIG. 4, and may be configured as described below. For example, the user endpoint devices 108, 110, 112, and 114 may each comprise a mobile device, a cellular smart phone, a gaming console, a set top box, a laptop computer, a tablet computer, a desktop computer, an application server, a bank or cluster of such devices, and the like. In one example, any one of the user endpoint devices 108, 110, 112, and 114 may be operable by a human user to develop pieces of source code, search data sources such as databases (DBs) 106 and 132 for reusable lines of code, and/or to submit a piece of source code to AS 104 for analysis and quantification of the amount of reused code in the piece of source code and/or the amount of resources saved due to the reuse of code in the piece of source code, as discussed in greater detail below.

In one example, any one or more of the UEs 108-114 may execute a software application (e.g., a set of executable instructions) that cooperates with the AS 104 (and/or with the server(s) 126) for automated quantification of software code reuse and/or quantification of the impact of software code reuse, in accordance with the present disclosure. For instance, the software application may be stored in a memory of a UE 108-114 and executed by a processor of the UE 108-114 to analyze a piece of source code. Under the direction of the software application, the UE 108-114 may provide a piece of source code to be analyzed to the AS 104, where the piece of source code may be stored locally on the UE 108-114 or remotely (e.g., in the DB 106 or elsewhere). The AS 104 may estimate an amount of the piece of source code that comprises reused code (e.g., number or percentage of lines of code in the piece of source code that are reused), potentially in cooperation with the DB 106.

The AS 104 may then estimate a resource cost associated with the development of the piece of source code. The resource cost may comprise an amount of money spent developing the piece of source code, an amount of time spent developing the piece of source code, an amount of some other resource that was expended developing the piece of source code, or any combination thereof. In one example, the AS 104 may retrieve financial data from a UE 108-114, DB 106, and/or DB 132 and may estimate the resource cost based on the retrieved financial data. Subsequently, the AS 104 may estimate an amount of resources saved by reusing the reused code in the piece of source code, based on the amount of the piece of source code containing reused code and the resource cost. The AS 104 may provide a report detailing the resource savings. In further examples, the AS 104 may initiate or recommend actions to be taken to modify the piece of source code in response to the resource savings. For instance, the AS 104 may recommend that the amount of reused source code in the piece of source code be increased or decreased, or may recommend specific sources from which code can be extracted for reuse in the piece of source code.

In one example, one or more of the servers 126 and one or more of the databases (DBs) 132 may be accessible to user endpoint devices 108, 110, 112, and 114 and to the AS 104 via Internet 124 in general. The server(s) 126 and DBs 132 may operate in a manner similar to the AS 104 and DB 106, as described in further detail below. In further examples, the server(s) 126 and DBs 132 may serve as additional sources of code that can be extracted for reuse.

Figure 4:
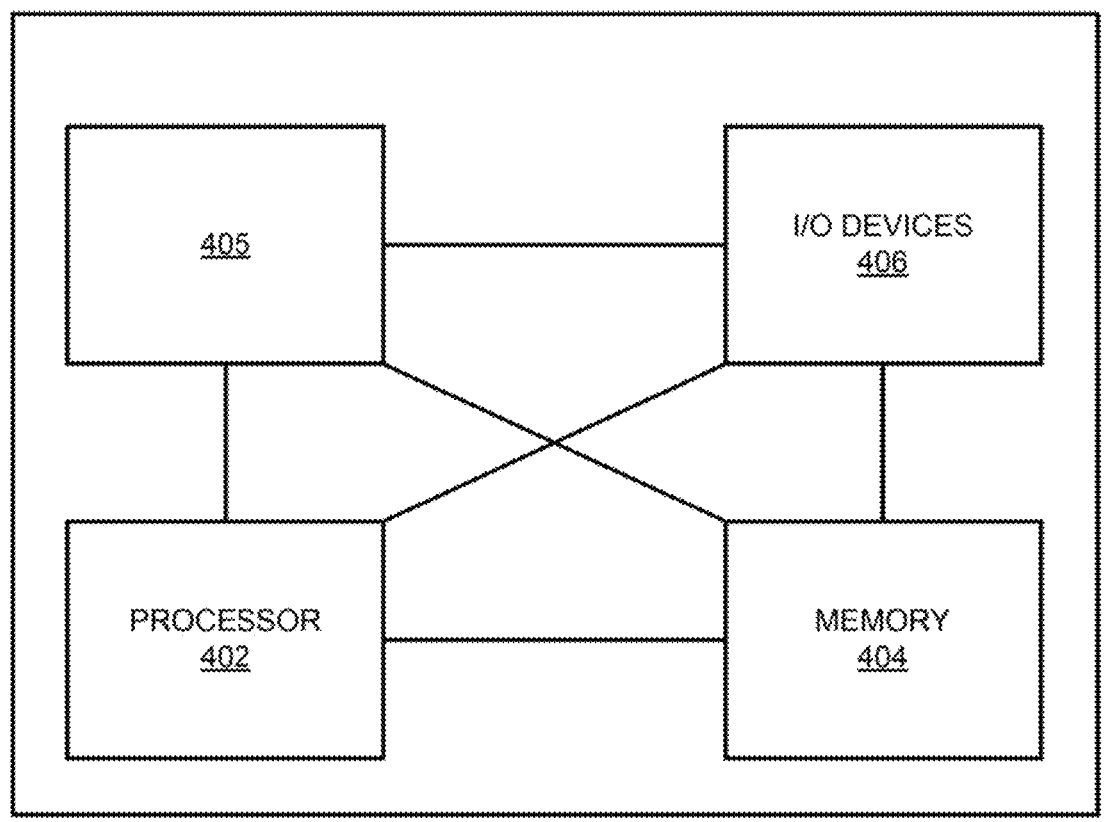
FIG. 4 illustrates an example of a computing device, or computing system, specifically programmed to perform the steps, functions, blocks, and/or operations described herein.

The AS 104 may comprise one or more physical devices, e.g., one or more computing systems or servers, such as computing system 400 depicted in FIG. 4, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, the DB 106 may comprise a physical storage device integrated with the AS 104 (e.g., a database server or a file server), or attached or coupled to the AS 104, in accordance with the present disclosure. In one example, the AS 104 may load instructions into a memory, or one or more distributed memory units, and execute the instructions for automated quantification of the impact of software code reuse as described herein. One example method for automated quantification of the impact of software code reuse is described in greater detail below in connection with FIG. 2.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, media streaming servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

Figure 2:
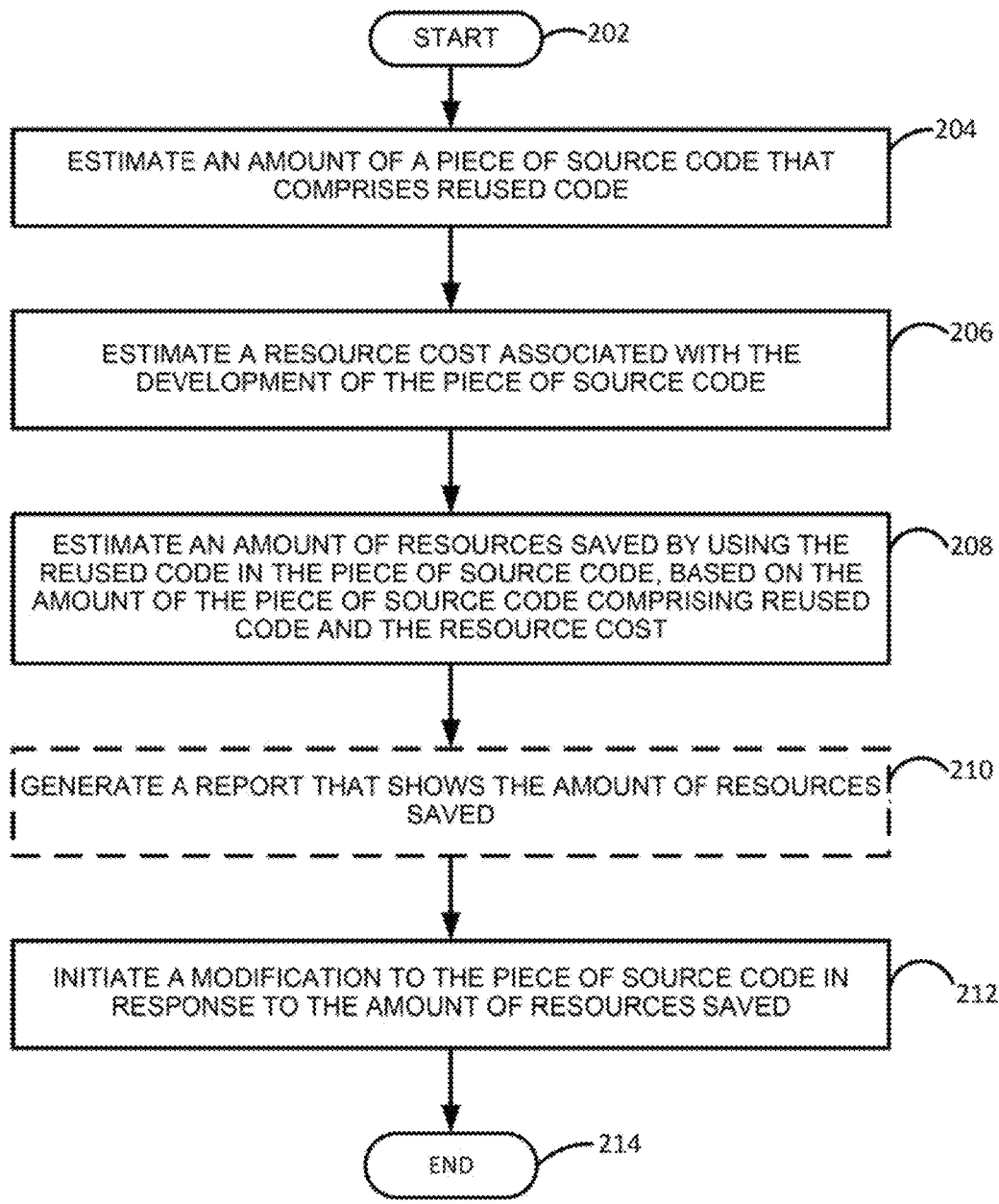
FIG. 2 illustrates a flowchart of an example method for automated quantification of the impact of software code reuse, in accordance with the present disclosure.

FIG. 2 illustrates a flowchart of an example method 200 for automated quantification of the impact of software code reuse, in accordance with the present disclosure. In one example, steps, functions and/or operations of the method 200 may be performed by a device as illustrated in FIG. 1, e.g., an application server (AS) 104 or any one or more components thereof. In another example, the steps, functions, or operations of method 200 may be performed by a computing device or system 400, and/or a processing system 402 as described in connection with FIG. 4 below. For instance, the computing device 400 may represent at least a portion of AS 104 in accordance with the present disclosure. For illustrative purposes, the method 200 is described in greater detail below in connection with an example performed by a processing system, such as processing system 402.

The method 200 begins in step 202 and proceeds to step 204. In step 204, the processing system may estimate an amount of a piece of source code that comprises reused code.

In one example, the piece of source code comprises a plurality of lines of code. For instance, the piece of source code may embody a software application. In a further example, the piece of source code may comprise a software installation package (e.g., all of the information that an operating system requires to install or uninstall an application or product and to run the setup user interface, including an installation database, a summary information stream, data streams for various parts of the installation, transforms, internal source files, and/or external source files or cabinet files required by the installation).

The plurality of lines of code may comprise a combination of one or more of: reused code extracted from existing pieces of source code belonging to an enterprise that developed the piece of source code (e.g., a communications network provider), reused code extracted from commercially provided (e.g., third party) pieces of source code, reused code provided by an open network automation platform (ONAP), reused code provided by an open-source code source, and newly developed (i.e., not reused) code. In these examples, all but the newly developed code may comprise different specific instances of reused code (i.e., reused code from different sources). Software developers often leverage available open source software components and commercial software components when developing new software products.

For instance, in one example, the code contributions for a piece of source code X may be expressed as:

$$X = A + B + C + D + E \qquad \text{(EQN. 1)}$$

where A represents reused code extracted from existing pieces of source code belonging to the enterprise that developed the piece of source code X, B represents reused code extracted from commercially provided (e.g., third party) pieces of source code, C represents reused code provided by an ONAP, D represents reused code provided by an open-source code source, and E represents newly developed (i.e., not reused) code. In one example, where A, B, C, D, and E are all percentages, E=1−A+B+C+D.

As discussed above, estimating the amount of the piece of source code that comprises reused code may comprise estimating a number of lines of code of the plurality of lines of code that comprise reused code (e.g., reused from existing pieces of source code belonging to the enterprise, reused code extracted from commercially provided pieces of source code, reused code provided by an ONAP, and/or reused code provided by an open-source code source). One example of a method for estimating a number of lines of reused code in a piece of source code is described in further detail in U.S. patent application Ser. No. 17/805,023, filed Jun. 1, 2022, which is herein incorporated by reference.

In one example, knowing the number of lines of reused code in a piece of source code allows for estimation of a percentage of the piece of source code that comprises reused code. For instance, by dividing the number of lines of reused code in the piece of source code by the total number of lines of code in the piece of source code, a number representing the percentage of the piece of source code that comprises reused code can be obtained. Alternatively or in addition, knowing the number of lines of reused code in a piece of source code allows for estimation of the ratio of reused code to newly developed code in the piece of source code. Thus, in step 204, the amount of the piece of source code that comprises reused code could be expressed as a number of lines of reused code, a percentage of the total number of lines of code in the piece of source code that comprises reused code, a ratio of reused code to newly developed code in the piece of source code, or as another quantity.

In one example, the total number of lines of code in the piece of source code may be computed according to one or more rules acquired from a knowledge base (e.g., a database, or an application server). These rules may be specific to the programming language in which the piece of source code is written, as some programming languages may be considered more compact or succinct than others. For instance, the calculation of the total number of lines of code may comprise a physical count of the lines of code or a logical count of the lines of code. Within this context, a physical count of the lines of code is understood to refer to a number of lines in the text of the piece of source code, not including comment lines. A logical count of the lines of code is understood to refer to the number of executable statements in the piece of source code. However, the specific definition of an executable "statement" may vary with the specific programming language used to write the piece of source code. For instance, a simple logical count measure for a C-like programming language might comprise a count of the number of statement-terminating semicolons.

In one example, the piece of source code may be obtained from a repository of source code or from source files. The piece of source code may be a newly developed piece of source code (i.e., developed by a human code developer or by a computer/artificial intelligence-driven system), or may be a piece of source code that was developed in the past and which is now being analyzed for quantification of the impact of source code reuse.

In step 206, the processing system may estimate a resource cost associated with the development of the piece of source code. In one example, the resource cost may comprise a monetary cost (e.g., how much money the piece of source code cost to develop), a time cost (e.g., how long it took to develop the piece of source code), or a combination of a monetary cost and a time cost. In another example, the resource cost may relate to some resource other than money or time. In one example, examples of the present disclosure assume that the unit cost of software application development is equivalent across an enterprise, a third party, ONAP, and open-source.

In one example where the resource cost comprises a monetary cost, the resource cost may be estimated from financial information associated with the development of the piece of source code. For instance, a first percentage of the monetary cost of development of a piece of source code may be associated with developing the newly developed (i.e., not reused) code by the enterprise, while a second percentage of the monetary cost of development of a piece of source code may be associated with the ingesting and testing of the piece of source code. For instance, the monetary cost of development M of a piece of source code X may be expressed as:

$$M = G + H \quad \text{(EQN. 2)}$$

where G represents the cost of developing the newly developed code by the enterprise and H represents the cost of ingesting and testing of the piece of source code X.

In one example, the ratio of the first percentage to the second percentage is assumed to be similar across software applications. The first percentage plus the second percentage may equal one hundred when summed. Thus, the percentage of the (monetary) development costs attributable to development of the newly developed (i.e., not reused) code by the enterprise may be estimated by subtracting the percentage of the (monetary) development costs attributable to ingesting and testing of the piece of source code from one. In other words, if G is expressed as the first percentage, and H is expressed as the second percentage, then G may be calculated as 1−H.

Once the percentage of the (monetary) development costs associated with developing the newly developed (i.e., not reused) code by the enterprise (i.e., G) is estimated, the percentage of the (monetary) development costs associated with developing the newly developed (i.e., not reused) code by the enterprise may be multiplied by the known cost of development incurred by the enterprise in developing the piece of source code (which may be obtained from a product identifier and/or product tracking software) in order to estimate the monetary costs incurred by the enterprise in developing the newly developed code. For instance, the resource (e.g., monetary) costs I incurred by the enterprise in developing the newly developed code may be expressed as:

$$I = F \times G \quad \text{(EQN. 3)}$$

where F represents the known cost of development incurred by the enterprise in developing the piece of source code, and G represents the cost of developing the newly developed code by the enterprise as noted above.

In step 208, the processing system may estimate an amount of resources saved by using the reused code in the piece of source code, based on the resource cost (e.g., as estimated in step 206) and the amount of the piece of source code comprising reused code (e.g., as estimated in step 204).

For instance, an amount of resources saved (or, an estimate cost avoidance) due to reuse of open-source code may be estimated as the ratio of the percentage of the piece of source code reused/extracted from open-source sources to the percentage of the piece of source code that is newly developed by the enterprise (i.e., not reused), multiplied by the resource cost. In one example, the estimated cost avoidance V due to reuse of open-source code may be expressed as:

$$V = (D/E) \times I \quad \text{(EQN. 4)}$$

where D represents reused code provided by an open-source code source as noted above (but could be substituted with reused code provided by another source in order to estimate the amount of resources saved due to reuse of that other source), E represents newly developed (i.e., not reused)

code, and I represents the resource (e.g., monetary) costs incurred by the enterprise in developing the newly developed code.

In optional step 210 (illustrated in phantom), the processing system may generate a report that shows the amount of resources saved. In one example, the report may show additional information beyond the amount of resources saved. For instance, the report may also show the amounts (e.g., percentages, lines of code, or the like) of the piece of source code that come from different sources (e.g., amount of reused code extracted from existing pieces of source code belonging to the enterprise that developed the piece of source code, amount of reused code extracted from commercially provided pieces of source code, amount of reused code provided by an ONAP, amount of reused code provided by an open-source code source, and amount of newly developed code).

Figure 3:
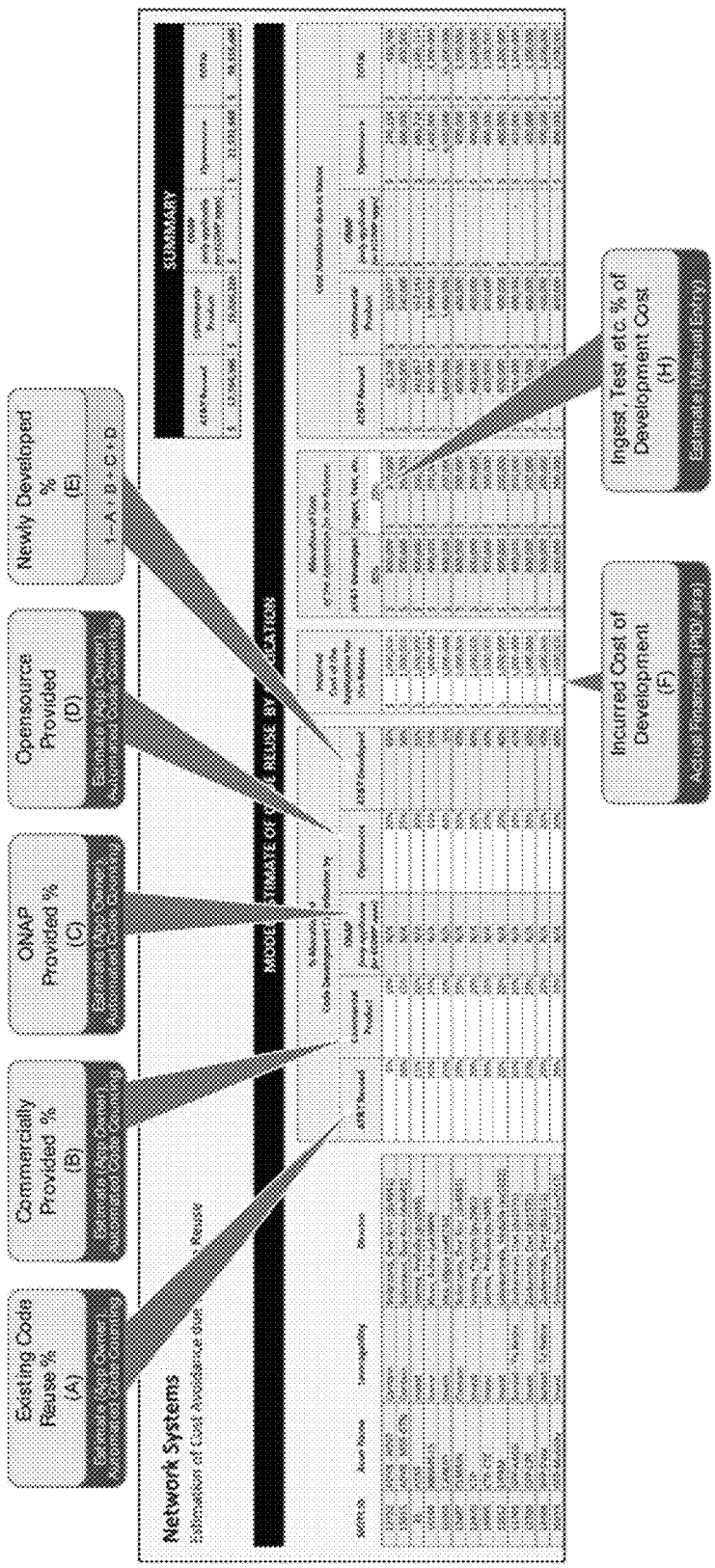
FIG. 3, for instance, illustrates an example screen shot of a report that may be generated to show an amount of resources saved through code reuse.

FIG. 3, for instance, illustrates an example screen shot 300 of a report that may be generated to show an amount of resources saved through code reuse. The report may show the amounts (e.g., percentages, lines of code, or the like) of the piece of source code that came from different sources, the allocation of costs incurred in the development of the piece of source code, and the amounts of resources saved due to reuse of each source of code, among other information.

In step 212, the processing system may initiate a modification to the piece of source code in response to the amount of resources saved. In one example, the modification may relate to the amount of code that is reused in the piece of source code. For instance, if the amount of resources saved does not meet at least a predefined threshold amount of resources saved (or if the total cost of developing the piece of source code is over budget), the processing system may recommend that the developers of the piece of source code make use of more reused code. Moreover, the processing system may recommend specific sources from which code can be extracted for reuse (e.g., "Consider using more open-source code to further conserve resources") or may recommend reusing less code from specific sources in order to meet other development aims (e.g., "Consider using less open-source code to limit code vulnerabilities").

In one example, the processing system may take action to automatically implement one or more recommendations, such as replacing one or more lines of code in the piece of source code with one or more lines of reused code that are identified as being potentially similar. In another example, the processing system may solicit user (e.g., developer) consent before making any suggested changes to the piece of source code.

The method 200 may end in step 214. However, in some examples, one or more of steps 204-212 may be repeated, e.g., in response to modifications that are initiated in step 212. For instance, the modified piece of source code may be evaluated in order to determine if the modification results in a change in the amount of resources saved, or to determine if further modifications should be made to the piece of source code.

Thus, examples of the present disclosure provide an automated means for quantifying the impact of code reuse. In one example, the amount of reused code in a piece of source code may be estimated. The amount of reused code may be expressed as a number of lines of code that are reused, or as a ratio of a number of lines of code that are reused to a total number of lines of code in the piece of source code. The resource cost (e.g., money and/or time) incurred in the development of the piece of source code may then be estimated, and an amount of resources saved may be estimated based on the amount of reused code and the resource cost. Thus, examples of the present disclosure allow one to quantify the impact of reusing code in a piece of source code (e.g., where the impact may be expressed as an amount of time and/or an amount of money that was saved by not writing the reused code from scratch).

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for automated quantification of the impact of software code reuse, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200 or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 405 for automated quantification of the impact of software code reuse (e.g., a software program comprising computer-executable instructions) can be loaded into memory 404 and executed by hardware processor element 402 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for automated quantification of the impact of software code reuse (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
    estimating, by a processing system including at least one processor, an amount of a piece of source code that comprises reused code, wherein different portions of the reused code originate from different code sources;
    estimating, by the processing system, a resource cost associated with a development of the piece of source code;
    estimating, by the processing system, an amount of resources saved by using the reused code in the piece of source code, based on the resource cost and the amount of the piece of source code that comprises the reused code;
    generating, by the processing system, a report that shows the amount of resources saved, wherein the report further shows, for each code source of the different code sources, a respective amount of the reused code that originated from the each code source and a respective portion of the amount of resources saved that is attributable to reuse of the respective amount of the reused code; and
    modifying, by the processing system an amount of reused code in a new piece of source code that is under development to meet an aim of the development, wherein the modifying is based on data in the report.

2. The method of claim 1, wherein the piece of source code comprises a plurality of lines of code.

3. The method of claim 2, wherein the amount of the piece of source code that comprises reused code comprises a number of lines of the plurality of lines of code that are reused.

4. The method of claim 2, wherein the amount of the piece of source code that comprises reused code comprises a percentage of the plurality of lines of code that comprises the reused code.

5. The method of claim 2, wherein the amount of the piece of source code that comprises reused code comprises a ratio of a number of lines of the plurality of lines of code that comprises the reused code to a number of lines of the plurality of lines of code that comprises newly developed code.

6. The method of claim 1, wherein the reused code is extracted from at least one of: an existing piece of source code belonging to an enterprise that developed the piece of source code, a commercially provided piece of source code, a code provided by an open network automation platform, or a code provided by an open-source code source.

7. The method of claim 1, wherein the resource cost comprises a time cost.

8. The method of claim 1, wherein the resource cost comprises a monetary cost.

9. The method of claim 8, wherein the resource cost is estimated from financial information associated with the development of the piece of source code.

10. The method of claim 6, wherein the resource cost is estimated as a known cost of development incurred by an enterprise in developing the piece of source code multiplied by a percentage of the known cost of development that is attributable to development by the enterprise of a portion of the piece of source code comprising newly developed code.

11. The method of claim 10, wherein the percentage of the known cost of development that is attributable to development by the enterprise of the portion of the piece of source code comprising newly developed code is estimated as one minus a percentage of the known cost of development that is attributable to ingesting and testing of the piece of source code.

12. The method of claim 11, wherein the amount of resources saved is estimated as a ratio of a percentage of the piece of source code comprising the reused code to a percentage of the piece of source code that is newly developed, multiplied by the resource cost.

13. The method of claim 1, wherein the modifying comprises increasing the amount of reused code in the new piece of source code.

14. The method of claim 1, wherein the modifying comprises decreasing the amount of reused code in the new piece of source code.

15. The method of claim 1, wherein the modifying comprises altering an amount of a portion of the reused code in the new piece of source code that originates from a specific source of the different code sources.

16. The method of claim 1, wherein the processing system solicits user consent prior to applying the modifying the amount of reused code in the new piece of source code.

17. A non-transitory computer-readable medium storing instructions which, when executed by a processing system including at least one processor, cause the processing system to perform operations, the operations comprising:
- estimating an amount of a piece of source code that comprises reused code, wherein different portions of the reused code originate from different code sources;
- estimating a resource cost associated with a development of the piece of source code;
- estimating an amount of resources saved by using the reused code in the piece of source code, based on the resource cost and the amount of the piece of source code that comprises the reused code;
- generating a report that shows the amount of resources saved, wherein the report further shows, for each code source of the different code sources, a respective amount of the reused code that originated from the each code source and a respective portion of the amount of resources saved that is attributable to reuse of the respective amount of the reused code; and
- modifying an amount of reused code in a new piece of source code that is under development to meet an aim of the development, wherein the modifying is based on data in the report.

18. A device comprising:
- a processing system including at least one processor; and
- a non-transitory computer-readable medium storing instructions which, when executed by the processing system, cause the processing system to perform operations, the operations comprising:
  - estimating an amount of a piece of source code that comprises reused code, wherein different portions of the reused code originate from different code sources;
  - estimating a resource cost associated with a development of the piece of source code;
  - estimating an amount of resources saved by using the reused code in the piece of source code, based on the resource cost and the amount of the piece of source code that comprises the reused code;
  - generating a report that shows the amount of resources saved, wherein the report further shows, for each code source of the different code sources, a respective amount of the reused code that originated from the each code source and a respective portion of the amount of resources saved that is attributable to reuse of the respective amount of the reused code; and
  - modifying an amount of reused code in a new piece of source code that is under development to meet an aim of the development, wherein the modifying is based on data in the report.

19. The method of claim 15, wherein the aim of the development comprises conserving development resources, and the altering comprises increasing an amount of reused code originating from an open source-source code source in the new piece of source code.

20. The method of claim 15, wherein the aim of the development comprises limiting vulnerabilities in the new piece of source code, and the altering comprises reducing an amount of reused code originating from an open source-source code source in the new piece of source code.

* * * * *